United States Patent
Isley

(10) Patent No.: US 8,169,891 B2
(45) Date of Patent: May 1, 2012

(54) APPARATUS AND METHOD FOR HANDLING LOST CELLS IN A COMMUNICATIONS SYSTEM

(75) Inventor: Kenneth Isley, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 1658 days.

(21) Appl. No.: 11/095,774

(22) Filed: Mar. 31, 2005

(65) Prior Publication Data

US 2006/0222011 A1   Oct. 5, 2006

(51) Int. Cl.
*H04J 1/00* (2006.01)

(52) U.S. Cl. .......................... 370/216; 370/252

(58) Field of Classification Search .......... 370/229–236, 370/389, 392, 394, 395.1–395.65, 474
See application file for complete search history.

(56) References Cited

U.S. PATENT DOCUMENTS

| | | | |
|---|---|---|---|
| 5,602,853 A | 2/1997 | Ben-Michael et al. | |
| 5,657,316 A * | 8/1997 | Nakagaki et al. | 370/394 |
| 5,742,765 A | 4/1998 | Wong et al. | |
| 5,781,549 A | 7/1998 | Dai | |
| 5,793,976 A * | 8/1998 | Chen et al. | 370/351 |
| 5,802,287 A | 9/1998 | Rostoker et al. | |
| 5,809,024 A | 9/1998 | Ferguson et al. | |
| 5,845,153 A | 12/1998 | Sun et al. | |
| 5,914,954 A * | 6/1999 | Nakayama | 370/394 |
| 6,115,360 A | 9/2000 | Quay et al. | |
| 6,201,813 B1 | 3/2001 | Klausmeier et al. | |
| 6,205,151 B1 | 3/2001 | Quay et al. | |
| 6,219,339 B1 * | 4/2001 | Doshi et al. | 370/395.61 |
| 6,262,995 B1 | 7/2001 | Kwak | |
| 6,269,357 B1 * | 7/2001 | Nakayama et al. | 375/240 |
| 6,430,187 B1 | 8/2002 | Park | |
| 6,483,854 B1 | 11/2002 | Klausmeier et al. | |
| 6,625,123 B1 | 9/2003 | Fukumoto et al. | |
| 6,711,167 B1 | 3/2004 | Ikeda et al. | |
| 6,804,243 B1 | 10/2004 | Humphrey et al. | |

(Continued)

FOREIGN PATENT DOCUMENTS

WO   WO 2004049179   6/2004

OTHER PUBLICATIONS

McDysan, et al., "ATM Theory and Applications," Signature Edition, Section 13.2, (1999) (pp. 351-358).

(Continued)

*Primary Examiner* — Pao Sinkantarakorn
(74) *Attorney, Agent, or Firm* — Ryan, Mason & Lewis, LLP

(57) ABSTRACT

A method of processing cells in a communication system includes obtaining a cell, causing it to be stored, determined if it is associated with a loss event, and if so, causing it to be tagged with a lost cell indicator. An apparatus for processing cells includes a cell processing module and a cell buffer interface that can interface with a cell buffer. The processing module is configured to obtain a cell, cause it to be stored through the buffer interface, determine if it is associated with a loss event, and if so, cause it to be tagged with a lost cell indicator. The lost cell indicator can preferably be a compressed lost cell indicator. The inventive tagging enhances computational efficiency compared to approaches that require moving a stored cell to make room for a complete dummy cell.

26 Claims, 17 Drawing Sheets

U.S. PATENT DOCUMENTS

| | | | |
|---|---|---|---|
| 6,931,009 B1 * | 8/2005 | Agarwal | 370/468 |
| 7,215,674 B1 * | 5/2007 | Vyas et al. | 370/395.2 |
| 2001/0015957 A1 * | 8/2001 | Kawarai et al. | 370/230 |
| 2002/0080821 A1 | 6/2002 | Hwang | |
| 2004/0085999 A1 | 5/2004 | Burnett et al. | |
| 2004/0165527 A1 * | 8/2004 | Gu et al. | 370/229 |

OTHER PUBLICATIONS

Gast, M.S., "T1 A Survival Guide," Provisioning & Managing Leased-Line Circuits, pp. 1-43 (2001).

Handel et al., "ATM Networks; Concepts Protocols Applications," Third Edition, Sections 5.1.5 and 5.7 (1998)(pp. 51-55 and 93-107).

Isley, K., "Apparatus and Method for Processing Cells in a Communications System," U.S. Appl. No. 11/095,769, filed Mar. 31, 2005.

"Series I: Integrated Services Digital Network; Overall Network Aspects and Functions—Protocol Layer Requirements," B-ISDN ATM Adaptation Layer Specification: Type 1 AAL, ITU-T Telecommunication Standardization Sector of ITU, ITU-T Recommendation I.363.1 (Aug. 1996).

"Circuit Emulation Service Interoperability Specification Version 2.0," The ATM Forum Technical Committee (Jan. 1997).

Isley, K., "Apparatus and Method for Fractional Processing of Cells in a Communications System," U.S. Appl. No. 11/476,279, filed Jun. 28, 2006.

* cited by examiner

RECEIPT OF A NORMAL
SEQUENCE OF 8 CELLS:
{0, 1, 2, 3, 4, 5, 6, 7}

RECEIPT OF A NORMAL SEQUENCE OF 8 CELLS: {0, 1, 2, 3, 4, 5, 6, 7} STORED CELLS ARE KEPT IN THE SAME BUFFER AS ACCEPTED CELLS

APPARATUS AND METHOD FOR HANDLING LOST CELLS IN A COMMUNICATIONS SYSTEM

CROSS-REFERENCE TO RELATED APPLICATIONS

The present application is related to U.S. patent application Ser. No. 11/095,769 of Kenneth Isley, filed on even date herewith, entitled "Apparatus and Method for Processing Cells in a Communications System"

FIELD OF THE INVENTION

The present invention relates to communications systems, and more particularly relates to an apparatus and method for handling lost cells in a communications system, by tagging cells associated with a loss event with a lost cell indicator.

BACKGROUND OF THE INVENTION

In communications systems that receive data from connectionless data-based networks, appropriate steps must be taken to deal with the possibility of lost cells. In some systems, for example, those using Asynchronous Transfer Mode (ATM) Adaptation Layer One (AAL1) lost cell processing in accordance with the International Telecommunication Union Specification ITU-T I.363.1 Robust Sequence Number Algorithm, lost cells may be handled by inserting dummy cells to fill the space that would have been occupied by the lost cell or cells. This requires moving a cell that has already been stored to make room for a dummy cell. This is a computationally expensive operation, and one does not know that a stored cell must be moved to make room for a dummy cell until it has already been stored. Alternately, a dedicated stored cell memory can be employed, but lost cell handling is then limited by the size of the dedicated memory.

Accordingly, there is a need in the prior art for a more efficient way to handle lost cells.

SUMMARY OF THE INVENTION

Aspects of the present invention, addressing the needs identified in the prior art, provide a method and apparatus for processing cells in a communication system. In one exemplary form, the method includes the steps of obtaining a cell, causing the cell to be stored, determining whether the cell is associated with a loss event, and if the cell is associated with a loss event, causing the cell to be tagged with a lost cell indicator. The indicator can preferably be a compressed indicator.

An illustrative embodiment of an apparatus according to the present invention can include a cell processing module and a cell buffer interface that is coupled to the processing module and that is configured to interface with a cell buffer. The processing module can be configured to obtain a cell, cause the cell to be stored in the buffer through the buffer interface, determine if the cell is associated with a loss event, and then tag the cell if it is associated with a loss event.

A more complete understanding of the present invention, as well as further features and advantages of the present invention, will be obtained by reference to the following detailed description and drawings.

DETAILED DESCRIPTION

Figure 1:
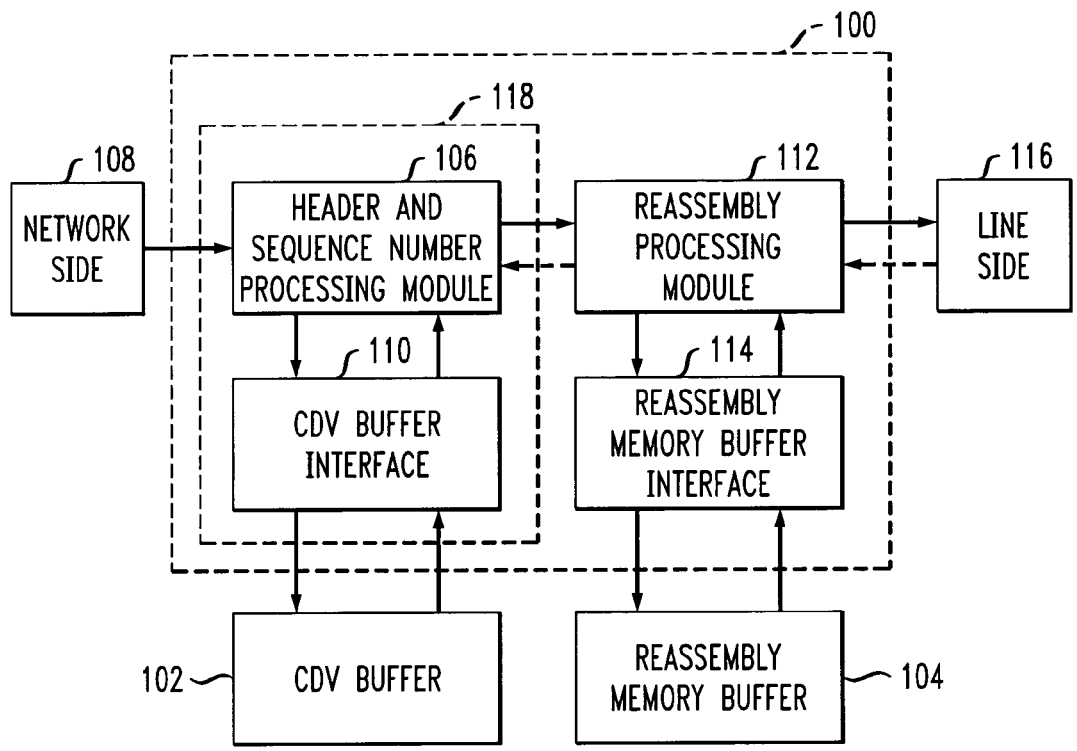
FIG. 1 is a segmentation and re-assembly apparatus in accordance with the present invention.

Referring now to FIG. 1, a segmentation and re-assembly apparatus 100, according to the present invention, can interface with a cell delay variation (CDV) buffer 102 and a re-assembly memory buffer 104. Apparatus 100 can include a header and sequence number processing module 106. Module 106 can be configured to obtain a plurality of cells, for example, from a network side 108. Apparatus 100 can also include a cell delay variation buffer interface 110 coupled to the processing module 106 and configured to interface with the cell delay variation buffer 102. Apparatus 100 can also include a re-assembly processing module 112 that is coupled to the header and sequence number processing module 106. Further, apparatus 100 can include a re-assembly memory buffer interface 114 that is coupled to the re-assembly processing module 112 and is configured to interface with the re-assembly memory buffer 104. Re-assembly processing module 112 can, for example, interface with a line side 116. Header and sequence number processing module 106 can be configured to cause a number of payloads from the cells to be stored in annotated form through CDV buffer interface 110, to cause a given one of the annotated payloads to be extracted through the CDV buffer interface 110, and to pass the payload information for the annotated payload that has been extracted to the re-assembly processing module 112. The bi-directional data flow between module 106, buffer interface 110, and buffer 102 is suggested by the arrows pointing in both directions.

As used herein, a reference to cells stored in "annotated form" means that the cells are stored in a form including the actual payload plus suitable header-type identifying data, that is, in a packet- or frame-oriented manner. The present invention may be advantageously employed where the cells that are processed are Asynchronous Transfer Mode (ATM) cells, such as ATM Adaptation Layer 0 (AAL0) or ATM Adaptation Layer 1 (AAL1) cells. Other types of cells, including other types of ATM cells, can be processed with the present invention. For example, type 3 and type 4 ATM AAL cells employ sequence numbering and it is believed that they may be advantageously processed with the present invention. Appropriate annotated forms for storage will depend on the type of cells being processed; in a preferred form of the invention, the annotated form is a modified ATM AAL1 segmentation and re-assembly protocol data unit (SAR-PDU) form to be discussed below.

The re-assembly processing module 112 can be configured to cause the payload information received from module 106 to be stored in the re-assembly memory buffer 104 through the re-assembly memory buffer interface 114. Further, re-assembly processing module 112 can cause the payload information to be extracted from re-assembly memory buffer 104 through re-assembly buffer interface 114. Operation of module 112, interface 114 and buffer 104 may be implemented using techniques that are similar to those employed for the caching of instructions and data for a central processing unit (CPU).

Line side 116, can be, for example, a clocked, constant bit rate telephone system, while network side 108 can be, for example, a connectionless data-based network. In such case, header and sequence number processing module 106 can be configured to interface with the network side, while re-assembly processing module 112 can be configured to interface with the line side 116. Module 112 can be configured to cause the payload information to be extracted from CDV buffer 102 through CDV buffer interface 110 and header and sequence number processing module 106, in response to a request received from the line side by the re-assembly processing module 112. This is suggested by the dotted lines interconnecting processing module 106, processing module 112, and line side 116. Accordingly, header and sequence number processing module 106 can be appropriately configured to cause extraction of the given payload from buffer 102 through buffer interface 110 responsive to the request received from re-assembly processing module 112. Re-assembly processing module 112 can be configured to make the request based on the contents of the re-assembly memory buffer 104 as determined through re-assembly memory buffer interface 114. Such a request can be made, for example, when contents of the re-assembly memory buffer 104 fall below a predetermined fixed threshold that is selected to be compatible with the data requirements of line side 116. The payload information can be passed from the header and sequence number processing module 106 to the re-assembly processing module 112 as a raw timeslot payload, accompanied by suitable payload alignment signals, for example, over a suitable bus structure. Element 118 represents a portion of apparatus 100 useful for handling lost cells and is discussed in a more general form with respect to FIG. 18.

It will be appreciated that the buffer interfaces discussed herein, such as buffer interfaces 110, 114, can vary in construction depending on whether buffers such as buffers 102, 104 are implemented on the same chip as modules such as modules 106, 112, or are external to the chip. In the former case, the interfaces can simply include the appropriate on-chip hard-wired interconnections, while in the latter case, appropriate interconnections to discrete memory devices can be employed.

Figure 2:
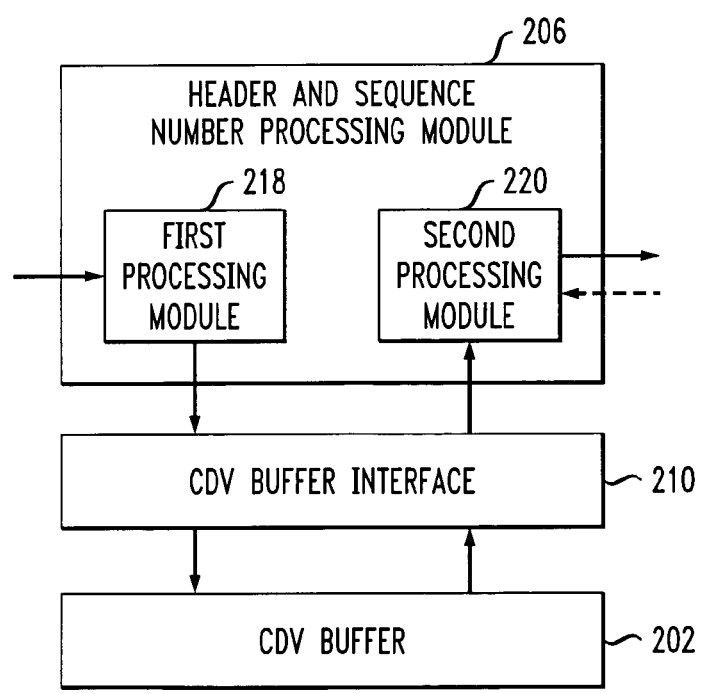
FIG. 2 depicts a preferred form of header and sequence number processing module for the apparatus of FIG. 1.

Reference should now be had to FIG. 2, wherein elements similar to those in FIG. 1 have received the same reference character incremented by 100. As shown in FIG. 2, in one preferred form of the present invention, the functioning of the header and sequence number processing module 206 is divided between first and second and processing modules 218, 220. First processing module 218 can be configured to obtain the plurality of cells and to cause the plurality of payloads from the cells to be extracted from the cells as appropriate and stored in the appropriate annotated form in CDV buffer 202 through CDV buffer interface 210. Second processing module 220 can be configured to cause the given annotated payload to be extracted from CDV buffer 202 through CDV buffer interface 210 and to then pass the payload information for the given annotated payload to the re-assembly processing module 112, as described above. At present, it is believed that in the preferred implementation of the invention, processing modules 218, 220 will be implemented as a combination of hardware and firmware running on embedded CPUs. This is desirable in order to correct any errors in handling of the cells, since only the firmware, rather than the hardware, needs to be changed. Note that a specific exemplary embodiment employing an Application Specific Integrated Circuit (ASIC) will be discussed below.

Figure 3:
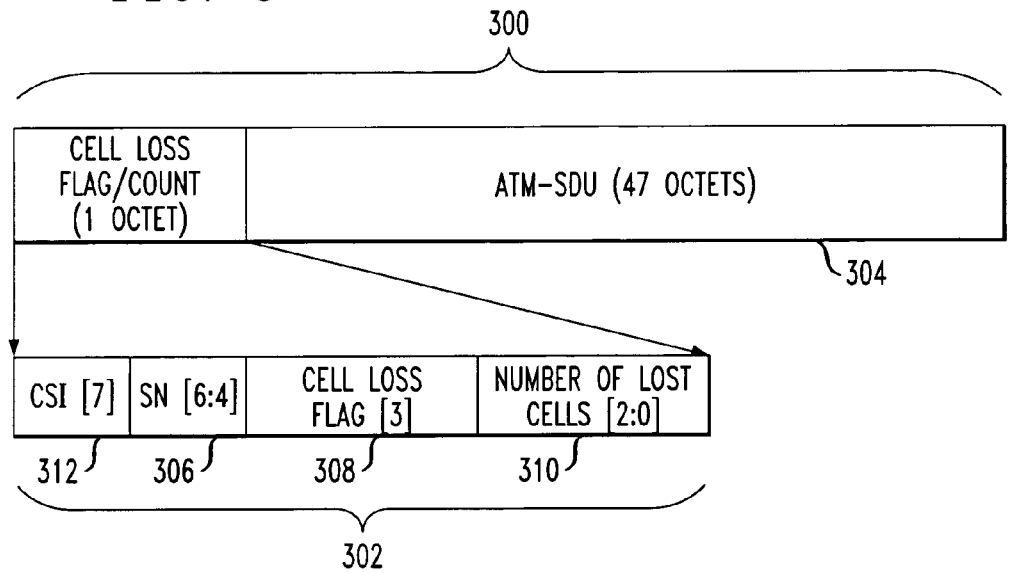
FIG. 3 depicts a modified form of segmentation and re-assembly protocol data unit (SAR-PDU) in accordance with the present invention.

Attention should now be given to FIG. 3, which depicts an ATM AAL1 modified SAR-PDU format 300 having a header portion 302 and a payload 304. Header portion 302 can, for example, be implemented as an 8 bit byte, and can include one or more of a sequence number field, a cell loss indication field, and a number of lost cells field. The sequence number field can be, for example, a three bit field 306 occupying bits 4, 5, and 6. The cells loss indication field can be, for example, a one bit cell loss flag occupying bit position 3, as show at 308. The number of lost cells field can be, for example, a three bit field occupying bit positions 0, 1 and 2 as shown at 310. A convergence sub-layer indication bit 312 can also be included, for example, at bit position 7. It will be appreciated that any appropriate header format including required data can be employed; the preferred format shown in FIG. 3 has been found to be useful in aspects of the present invention dealing with ATM AAL1 cells, including the handling of lost cells as will be discussed below. It is believed that certain advantages of the present invention, namely, the ability to use lower cost memory for the CDV buffer 202 by breaking up the CDV and re-assembly functions, are best achieved by storing the cell in an appropriate annotated form, as discussed above, preferably a SAR-PDU form, and most preferably a modified SAR-PDU form as depicted in FIG. 3. Using this type of data structure for storage in the CDV buffer, as opposed to the raw timeslot data, allows the breaking up of the two different buffering functions in accordance with the present invention. As noted, it is believed that other appropriate structures, such as ATM AAL type 3 or 4 cells, or additional AAL1 features, with appropriate header modifications if desired, may appropriately be employed.

Figure 4:
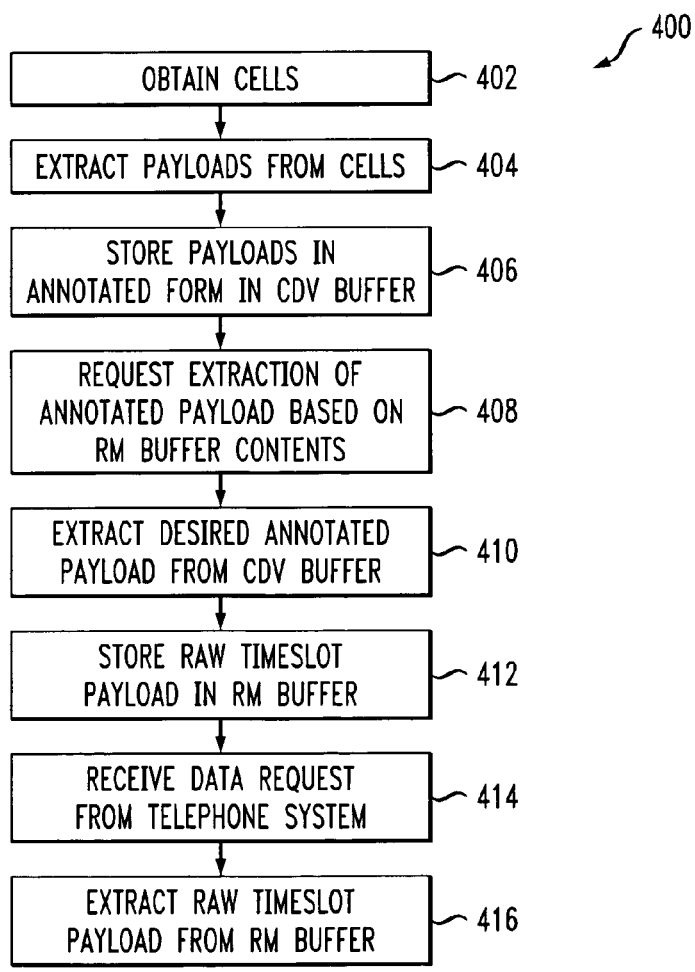
FIG. 4 depicts a flow chart showing method steps for processing cells in a communications system, according to the present invention.

Attention should now be given to FIG. 4 which depicts a flow chart 400 showing method steps of a method of processing cells in a communication system in accordance with the present invention. As depicted at block 402, the method includes obtaining a number of cells, storing the payloads of the cells in annotated form in a CDV buffer, as shown at block 406, causing extraction of a desired annotated payload from the CDV buffer, as per block 410, causing payload information of a given annotated payload to be stored in a re-assembly memory buffer as per block 412, and causing the payload information to be extracted from the re-assembly memory buffer as per block 416. In a preferred form of the invention, the cells are ATM AAL1 cells and they are stored in the CDV buffer in the annotated form described above. As indicated at block 412, the payload information can be stored in the re-assembly memory buffer as a raw timeslot payload. As indicated at block 414, a data request from a telephone system can be received, such that the payload information is extracted from the re-assembly memory buffer in response to the telephone system request. Step 410 can be performed by a header and sequence number processing module of the kind described above, while step 412 can be caused to be performed by a re-assembly processing module of the type described above. As per block 408, a request can be passed from the re-assembly processing module to the header and sequence number processing module for extraction of an annotated payload from the CDV buffer. The request can be issued based on contents of the re-assembly memory buffer, as discussed above. As per block 404, the payloads will typically be extracted from the cells.

Figure 5:
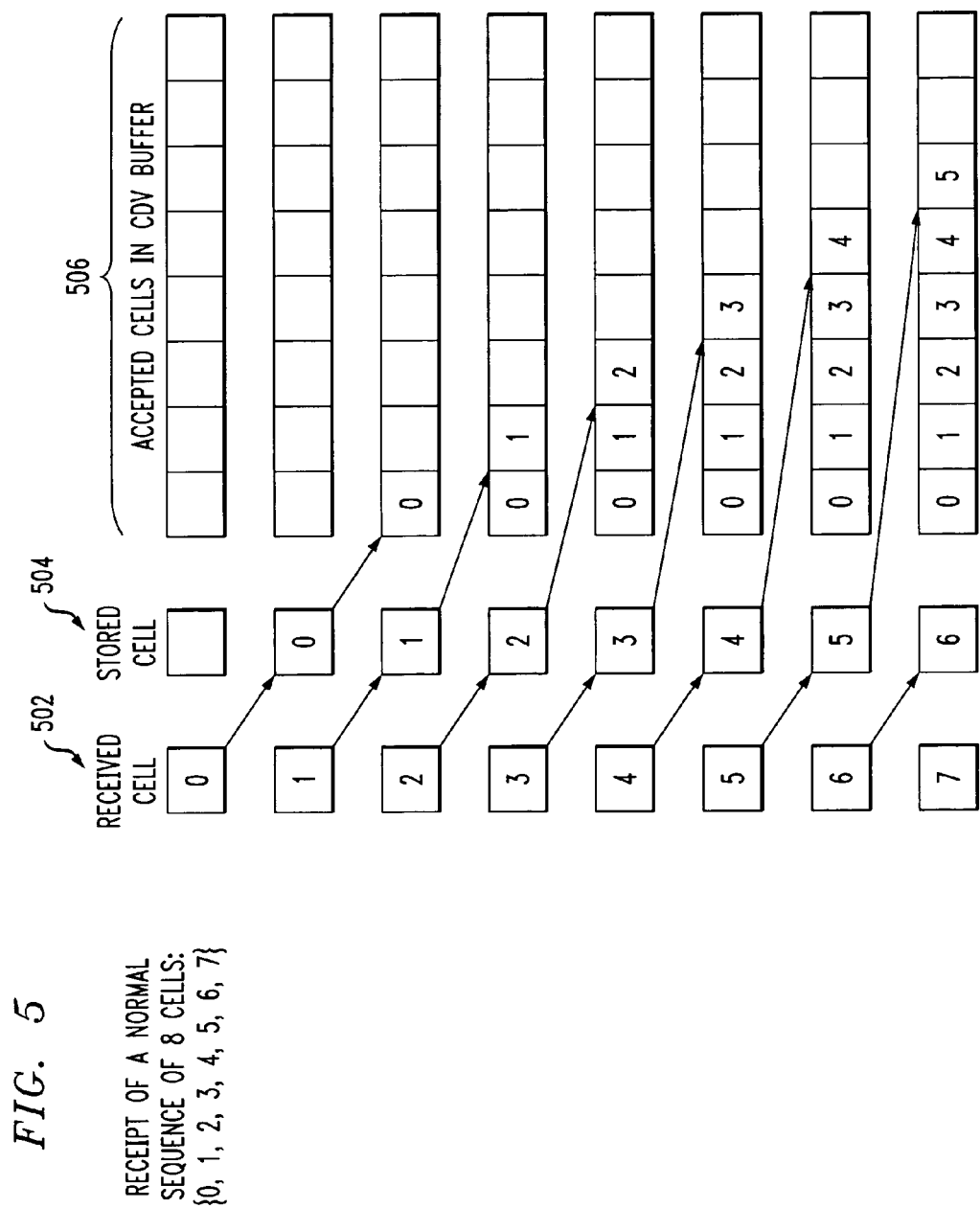
FIG. 5 shows one manner of receiving a normal sequence of eight cells in a communications system not employing the present invention.

The present invention provides the capability of detecting and handling lost cells in a communications system. Referring now to FIG. 5, in a technique not employing the present invention, a normal sequence of eight (8) cells numbered 0-7 are received, as per 502, stored, as per 504, and then accepted in a CDV buffer as per 506.

Figure 6:
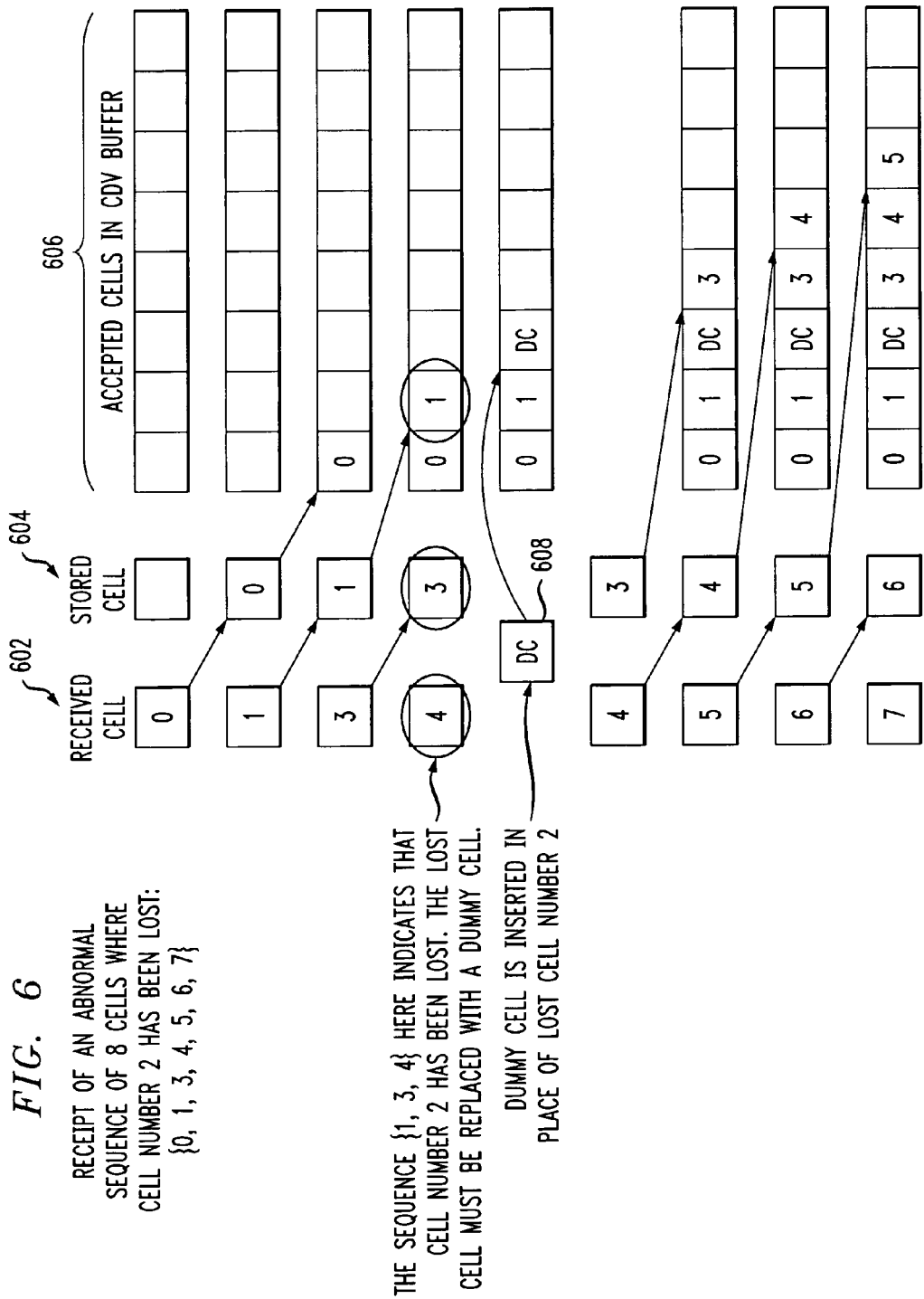
FIG. 6 depicts receipt of an abnormal sequence of eight cells in such a system.

Referring now to FIG. 6, receipt of an abnormal sequence of cells in the handling method described in FIG. 5 is depicted. In the abnormal sequence, cell number 2 has been lost. Once two (2) cells beyond the lost cell have been received, a determination is made that a cell has been lost and must be replaced with a dummy cell. The dummy cell 608 is inserted in place of the lost cell number 2. The type of processing shown in FIG. 5 and FIG. 6 can be implemented with a dedicated stored cell memory approach. In such case, a cell worth of memory must be allocated to each virtual channel that is being supported. Accordingly, if a system were to support 1,024 virtual channels, it would require 48 K bytes of dedicated memory to support simultaneous robust sequence number processing on all 1,024 channels.

Figure 7:
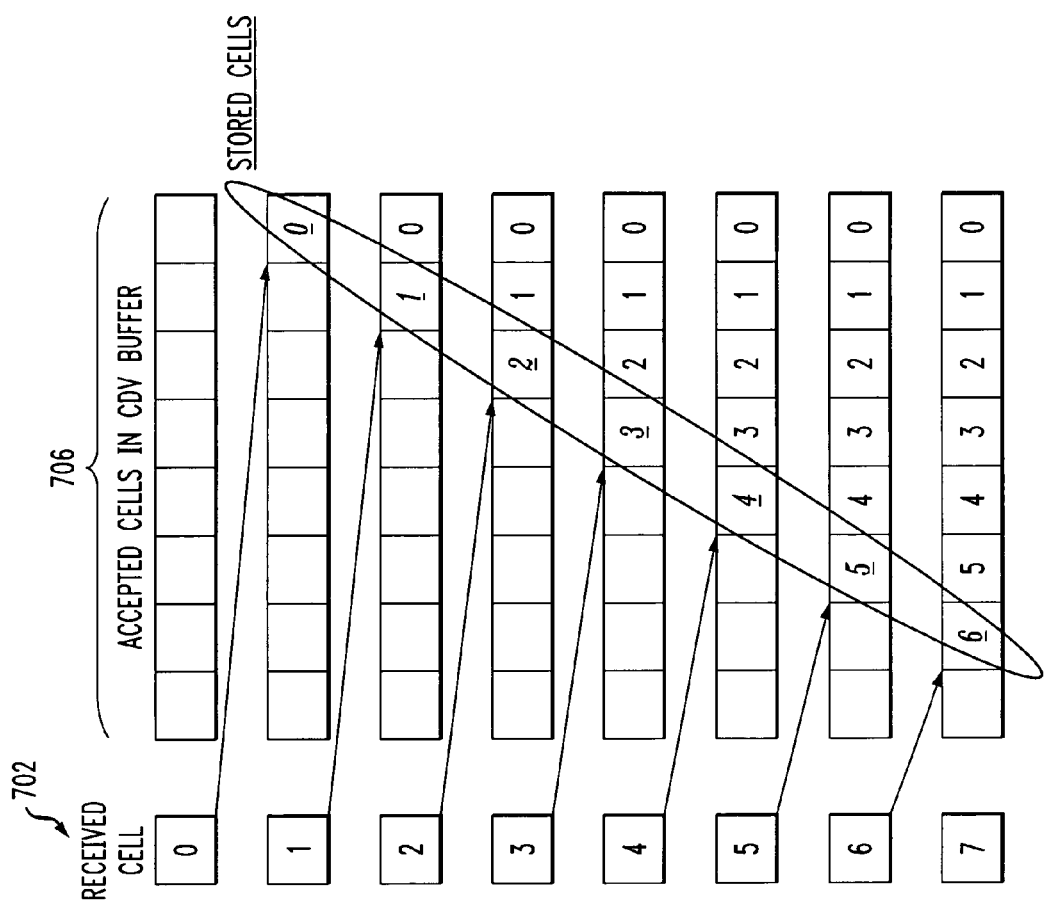
FIG. 7 depicts receipt of a normal sequence of eight cells in another form of communication system not employing the present invention.

Another technique that does not employ the present invention is the copy/insert approach. As shown in FIG. 7, for receipt of a normal sequence of 8 cells, the received cells 702 are stored directly in the CDV buffer 706. The stored cells are indicated by the circled sequence of cells 0-6.

Figure 8:
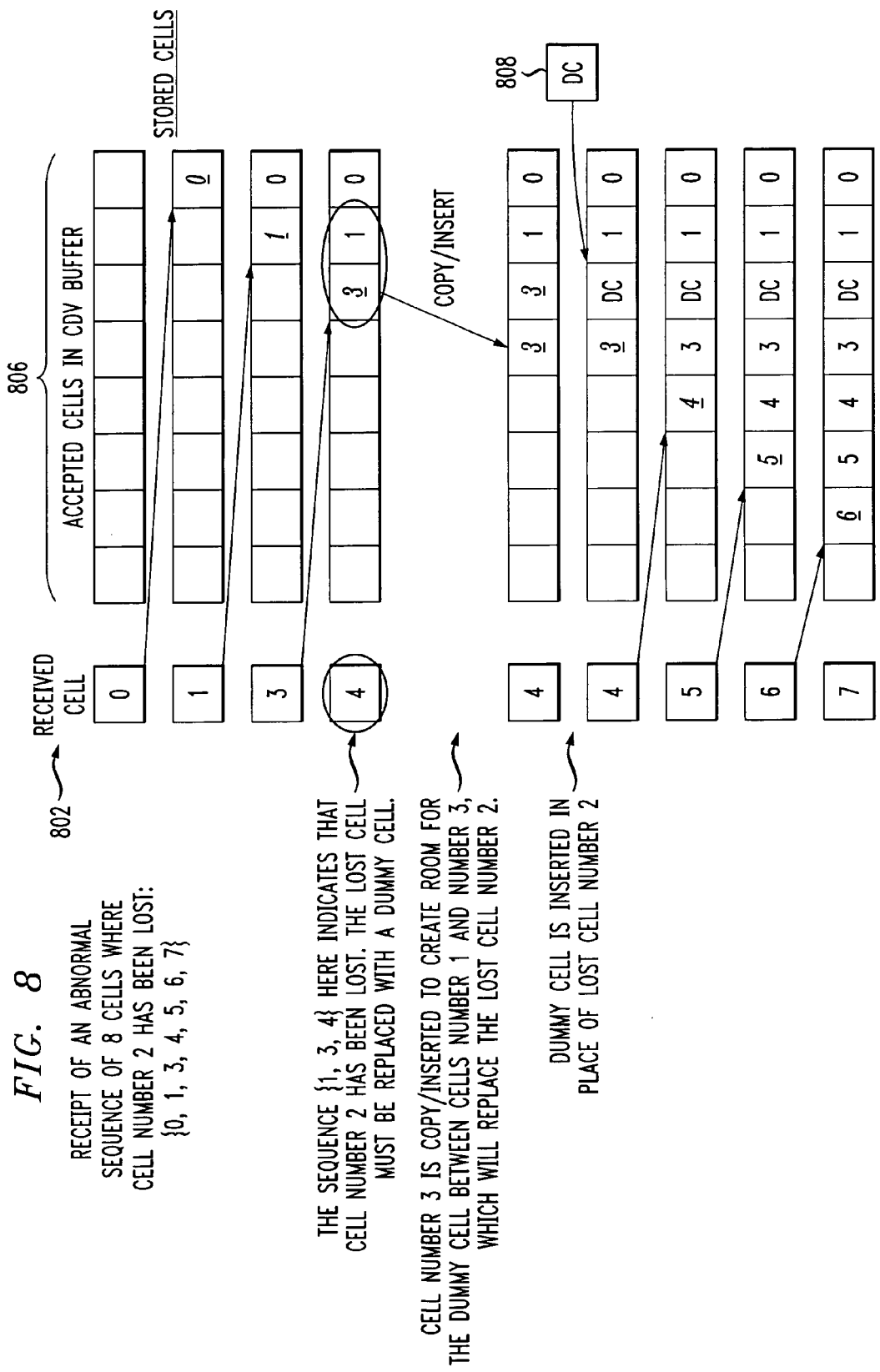
FIG. 8 depicts receipt of an abnormal sequence of eight cells in such a system.

FIG. 8 depicts the handling of an abnormal sequence of 8 cells where cell number 2 has been lost, using the copy/insert approach. When the missing cell number 2 is detected, the subsequently received cell number 3 is copied and inserted into the next slot, and the previous occurrence of cell number 3 is replaced with a dummy cell 808. While the approach depicted in FIG. 7 and FIG. 8 is efficient in terms of memory use, it requires that a copy/insert operation be performed each time that a cell is lost; the copying and insertion of up to 7 cells worth of data is a time consuming operation, and can place limitations on the number of simultaneous cell loss events that can be supported. Such designs may not be able to support cell loss on all virtual channels simultaneously, or may limit the number of cells that each channel can lose before an error occurs.

Figure 9:
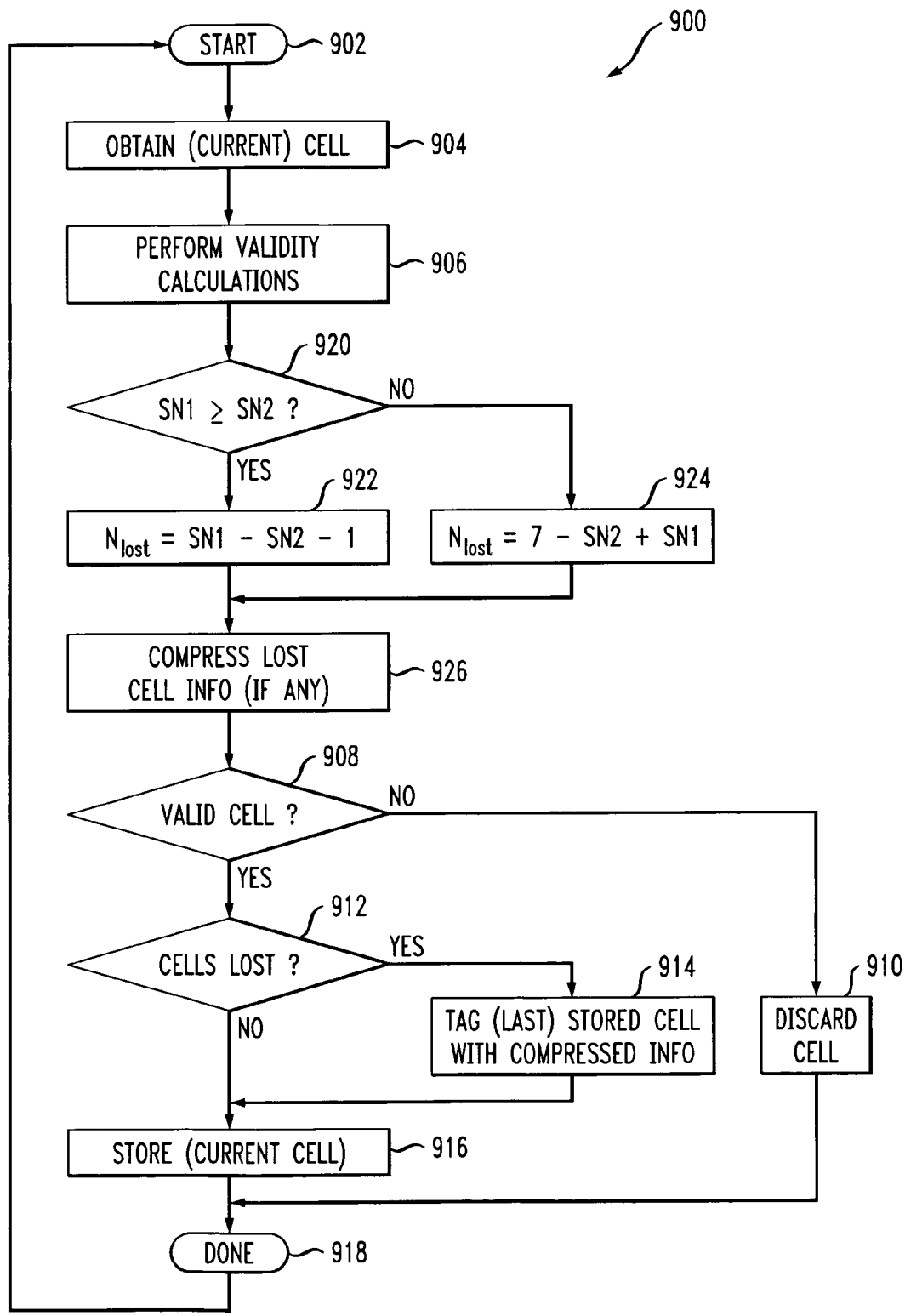
FIG. 9 is a flow chart depicting another method of processing cells in accordance with the present invention.

The memory and cell loss handling issues of the methods just discussed can be addressed using a method in accordance with the present invention. Reference should now be had to FIG. 9, which depicts a flow chart 900 showing method steps of a method of processing cells in a communication system according to the present invention. After beginning at 902, a cell can be obtained as per block 904. The just-obtained cell is referred to as the "current cell." Optionally, as per block 906, one can perform calculations to determine whether the cell is valid (for example, per International Telecommunication Union Specification ITU-T I.363.1); if it is determined at block 908 to be a mis-inserted cell or other invalid cell, it can be discarded as per block 910. Conversely, if the cell is not a mis-inserted cell or other invalid cell, a determination can be made per block 912 whether there has been a loss event (determination of the number of lost cells is discussed below). If that is the case, the last stored cell can be tagged with a lost cell indicator per block 914 (preferably compressed, as discussed below). While it is believed to be most efficient to tag the cell immediately following the loss event, other schemes may be employed, for example, the cell prior to the loss could be tagged with an indicator to insert the required number of lost cells worth of data after processing the cell prior to the loss event. In any case, when the current cell is valid, it can be stored as per block 916, for example, in a CDV buffer. Note that the arrow from block 918 to block 902 indicates that steps are normally repeated for additional cells in a sequence (e.g., 0 to 7) and for additional sequences of cells. Note also that when using Asynchronous Transfer Mode (ATM) Adaptation Layer One (AAL1) lost cell processing in accordance with the International Telecommunication Union Specification ITU-T I.363.1 Robust Sequence Number Algorithm, a determination is not made that a cell follows a loss event until the next cell is received, thus, the current cell is obtained and a determination of loss made per block 912, but it is the previously stored cell that is tagged with the lost cell indicator.

The lost cell indicator is preferably a compressed lost cell indicator; that is, it includes all the information needed to place a dummy cell in place of the lost cell, but without the necessity of using all the memory associated with the complete data for the dummy cell. One preferred form of compressed lost cell indicator is the modified header 302 discussed above with respect to FIG. 3, and particularly fields 308 and 310 thereof. As noted, such an indicator is particularly applicable to AAL1 cells, but it will be appreciated that appropriate tags may be constructed for other cells, such as, for example, ATM AAL (adaptation layer) type 3 and 4 cells employing sequence numbering. As used herein, compressing of information pertaining to the lost cell refers to any process of preparing data indicative of the lost cell that does not occupy as much space as the complete dummy cell would. It will be appreciated that techniques analogous to run-length encoding may appropriately be employed for the compression. In view of the foregoing discussion, it will be appreciated that the method depicted in flow chart 900 preferably includes the step of compressing lost cell information, as shown at block 926. The compressed indicator would normally include as least a flag that a cell has been lost and then a field indicating how many cells had been lost; as noted, the preferred form of flag is the modified header portion depicted in FIG. 3 above.

The method can include the step of determining how many cells have been lost in the loss event. An exemplary manner of making such determination is depicted at blocks 920, 922 and

924 of FIG. 9. One can determine whether a sequence number SN1 of the given cell is greater than or equal to the sequence number SN2 of the previously obtained cell, as depicted at block 920. If such is in fact the case, the number of lost cells can be calculated as:

$$N_{lost}=SN1-SN2-1 \quad (1)$$

Conversely, if SN1 is not greater than or equal to SN2, the number of lost cells can be calculated as:

$$N_{lost}=7-SN2+SN1 \quad (2)$$

It will be appreciated that while Equations 1 and 2 hold true for all cases, when seven cells are lost, regular signed mathematics yields a result of −1 instead of the expected 7. The skilled artisan will appreciate that various techniques may be used to address this; for example, unsigned math may be employed, or (with valid numbers for lost cells 0 through 7) a calculated result of minus 1 can be interpreted as the loss of 7 cells.

Figure 10:
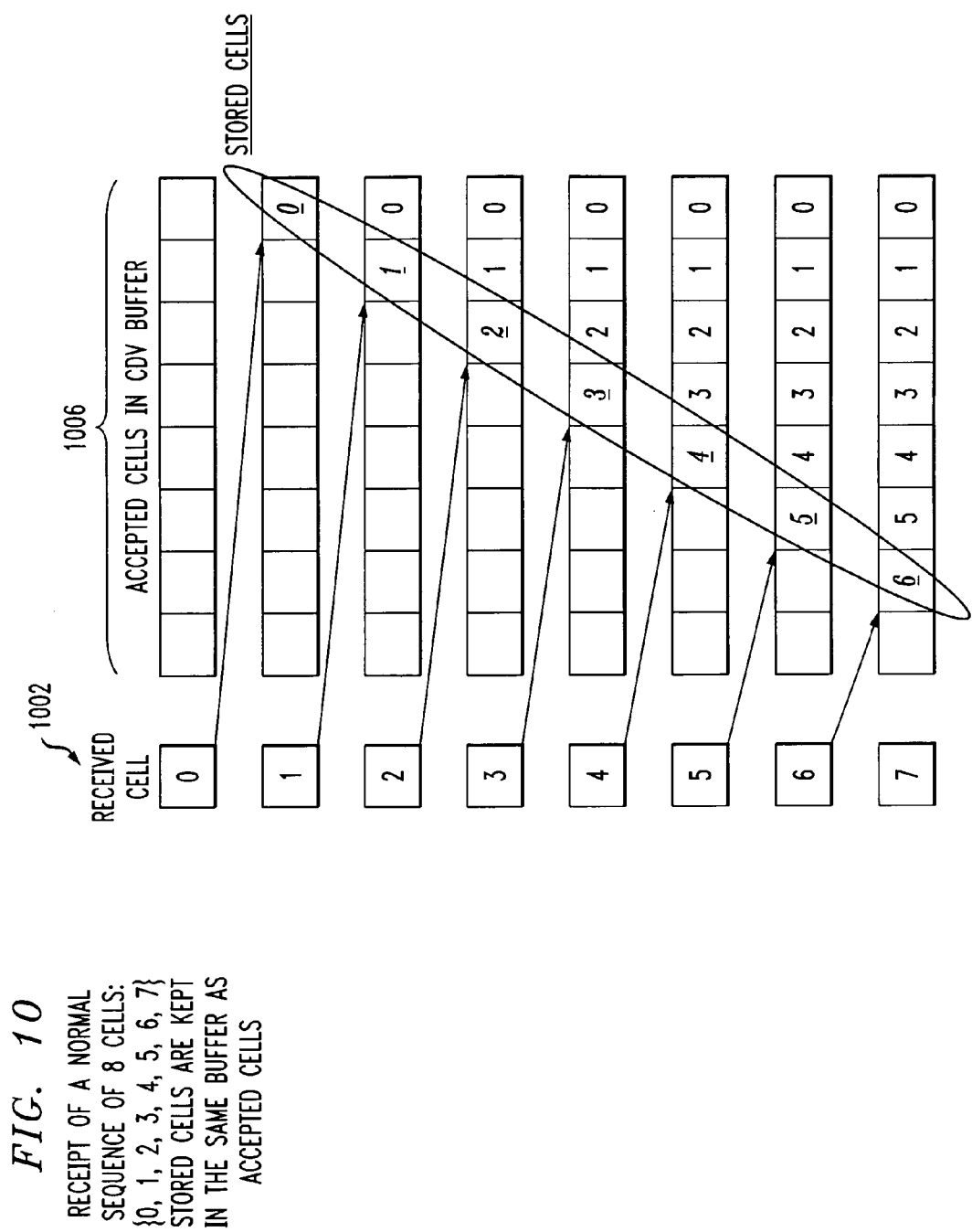
FIG. 10 depicts receipt of a normal sequence of eight cells in the present invention.
Figure 11:
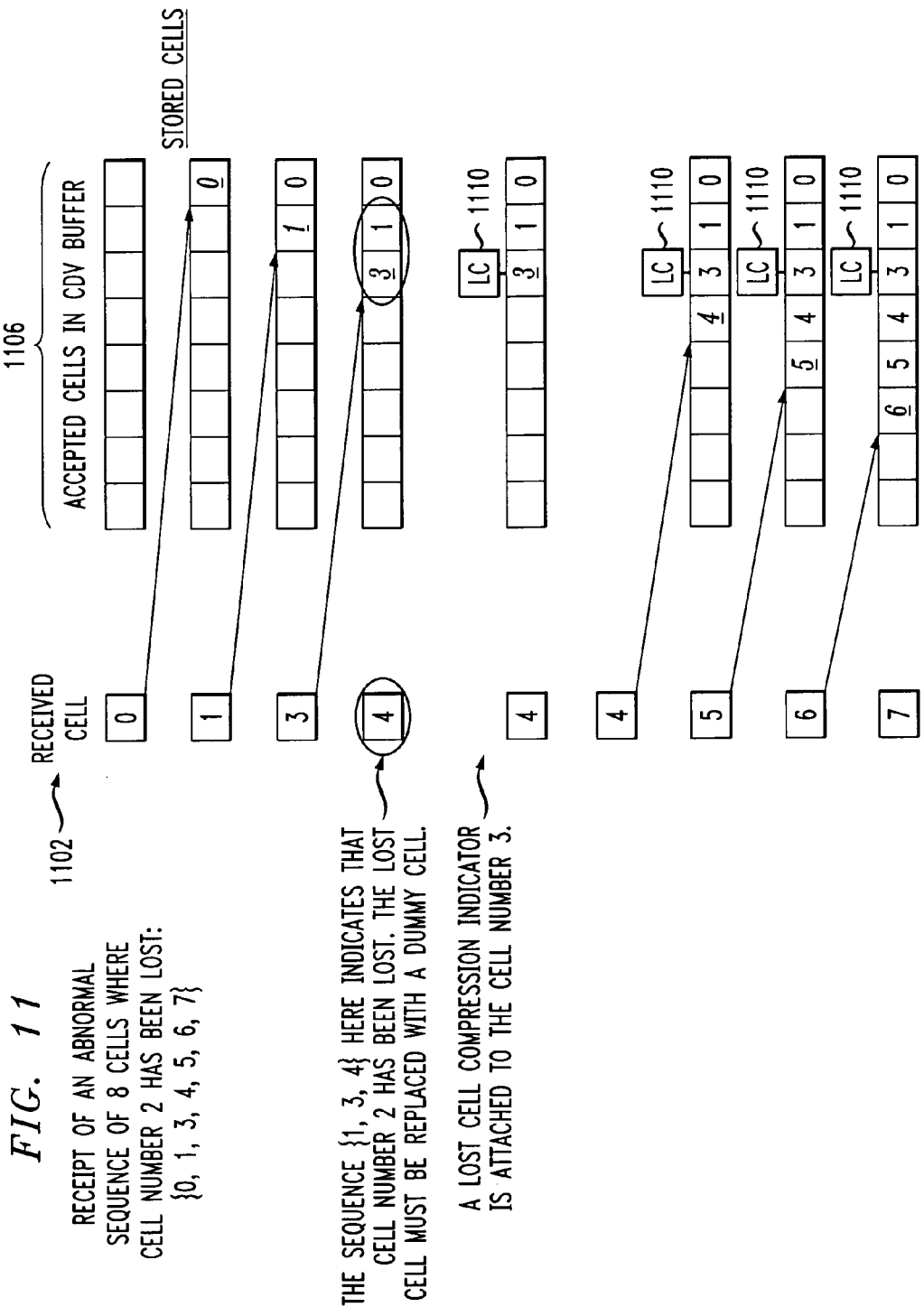
FIG. 11 depicts receipt of an abnormal sequence of eight cells including a lost cell in the present invention.

Referring now to FIG. 10, when a normal sequence of eight cells is received using the method depicted in flow chart 900, the received cells 1002 are placed into the CDV buffer as shown at 1006 in a manner similar to that depicted in FIG. 7. Referring to FIG. 11, when an abnormal sequence of cells is received, where cell number 2 has been lost, the received cells 1102 are placed into the CDV buffer 1106 as shown; but once cell number 4 has been received and it is determined that cell number 2 is missing, a lost cell indicator 1110 is attached to cell number 3, which immediately follows the loss event, that is, the loss of cell 2.

Figure 12:
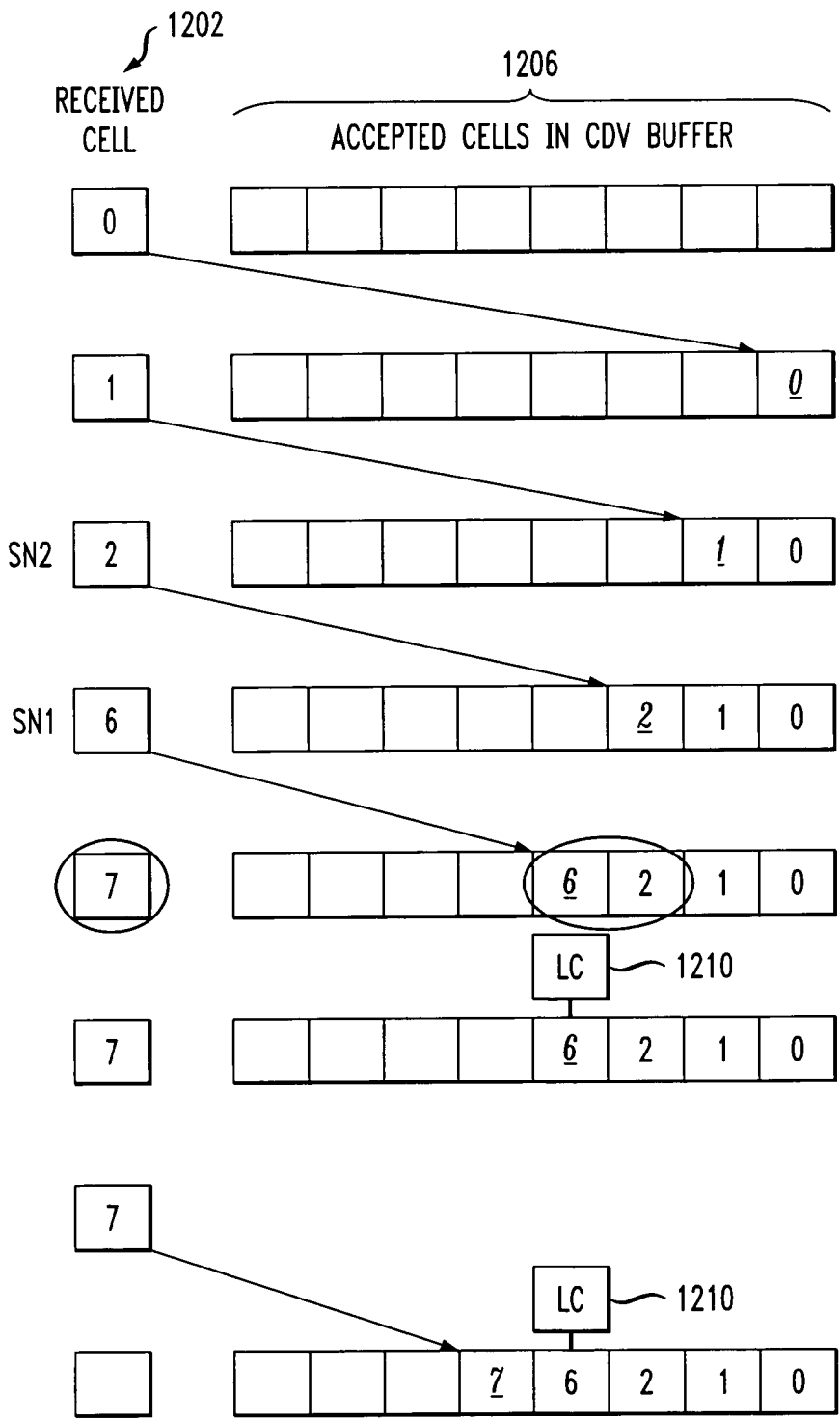
FIG. 12 depicts receipt of an abnormal sequence of cells wherein several cells are missing in accordance with the present invention.
Figure 13:
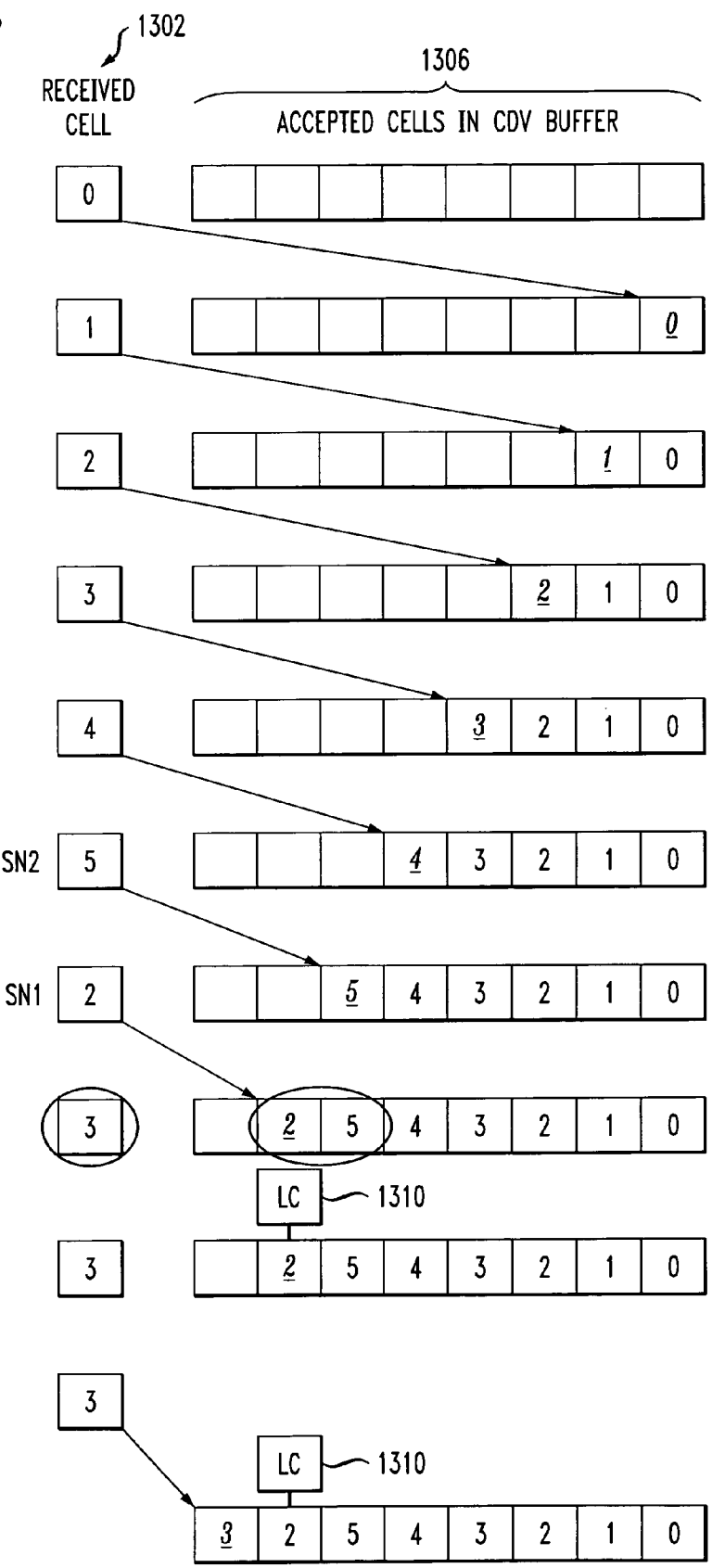
FIG. 13 depicts receipt of another sequence of abnormal cells in accordance with the present invention.

Referring to FIG. 12, a group of received cells 1202 is missing cells 3, 4 and 5. Again, the received cells are placed as accepted cells in the CDV buffer 1206, but a lost cell flag 1210 is attached to cell number 6 following the loss event. In this case, SN1 is greater than or equal to SN2, such that equation 1 is employed to calculate the number of lost cells. With reference to FIG. 13, a group of received cells 1302 is missing cells 6, 7, 0 and 1. In this case SN1 is less than SN2, and equation 2 is used to calculate the number of lost cells to be placed in flag 1310.

Figure 14:
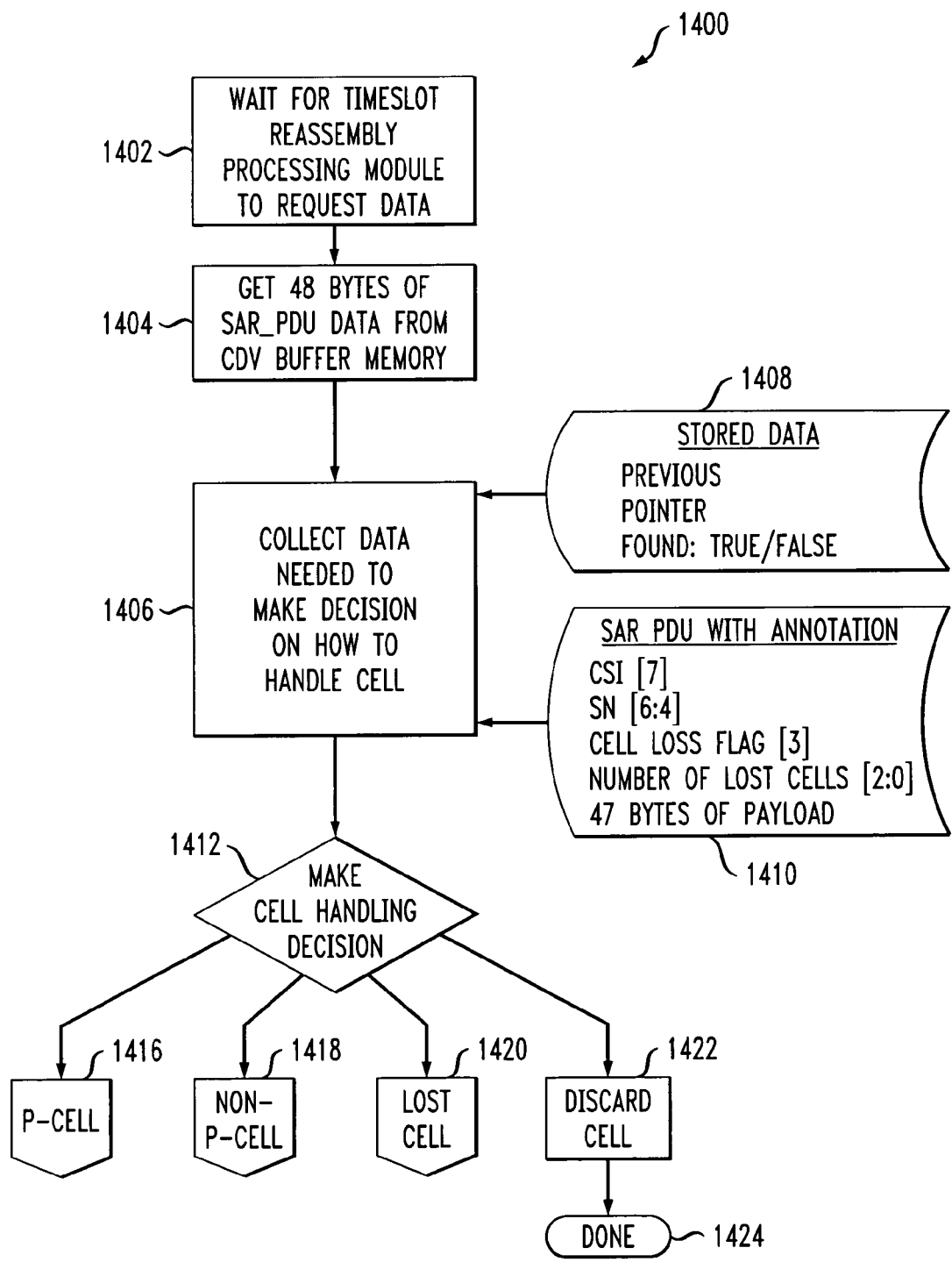
FIG. 14 depicts a flow chart showing inventive method steps for handling cells in accordance with the present invention.

Detection of lost cells and storing of cells in a buffer such as a CDV buffer, including the tagging of cells following a loss event with a lost cell indicator, has been depicted. It will be appreciated that the present invention also provides appropriate methods for extracting data from the buffer such as the CDV buffer and re-assembling the payloads of the cells. Reference should now be had to FIG. 14 which depicts a flow chart 1400 of an inventive method having suitable method steps for handling cells extracted from storage. Accordingly, a method according to the present invention can include extracting a given stored cell of the desired stored sequence from storage (for example, obtaining 48 bytes of SAR-PDU data from a CDV buffer memory as depicted at block 1404). Furthermore, the method can include determining, as indicated at decision block 1412, whether a given stored cell is tagged with a lost cell indicator. If such is the case, payload data for cells lost in the loss event can be recreated, for example, by a method to be discussed below with respect to FIG. 17. As per block 1406, appropriate data can be collected that is needed to make the decision in block 1412. Such data can include the information from the annotated SAR-PDU, including the convergence sublayer indication (CSI), which is used to signal whether the cell is a P-cell or a non-P-cell, as well as stored data regarding whether the "previous pointer found" parameter is true or false. Such data is indicated at blocks 1410 and 1408 respectively. Note that the "previously pointer found" parameter is optionally used, and is known to the skilled artisan from International Telecommunication Union Specification ITU-T I.363.1 (as is the aforementioned CSI). When the stored cell is not tagged with a lost cell indicator, the payload data can be extracted from the stored cell. As indicated at blocks 1416, 1418, such extraction can be performed in a different manner depending on whether the cell is a P-cell or a non-P-cell. As indicated at block 1420, where a lost cell tag is noted, appropriate processing can be carried out as discussed below with regard to FIG. 17. In appropriate circumstances, as indicated at block 1422, the cell is discarded and the process is finished as per block 1424. The skilled artisan will appreciate when it is appropriate to discard a cell. For example, in SDT Pointer mode (carrying more than one timeslot), one has to locate the first pointer (refer to "previous pointer found") before one can determine the correct alignment of the timeslots (i.e., timeslot "A" must be sent to receiver "A"). Until the initial pointer is received, one is unaware where a given timeslot is to be sent, and thus should discard the associated cells.

Figure 15:
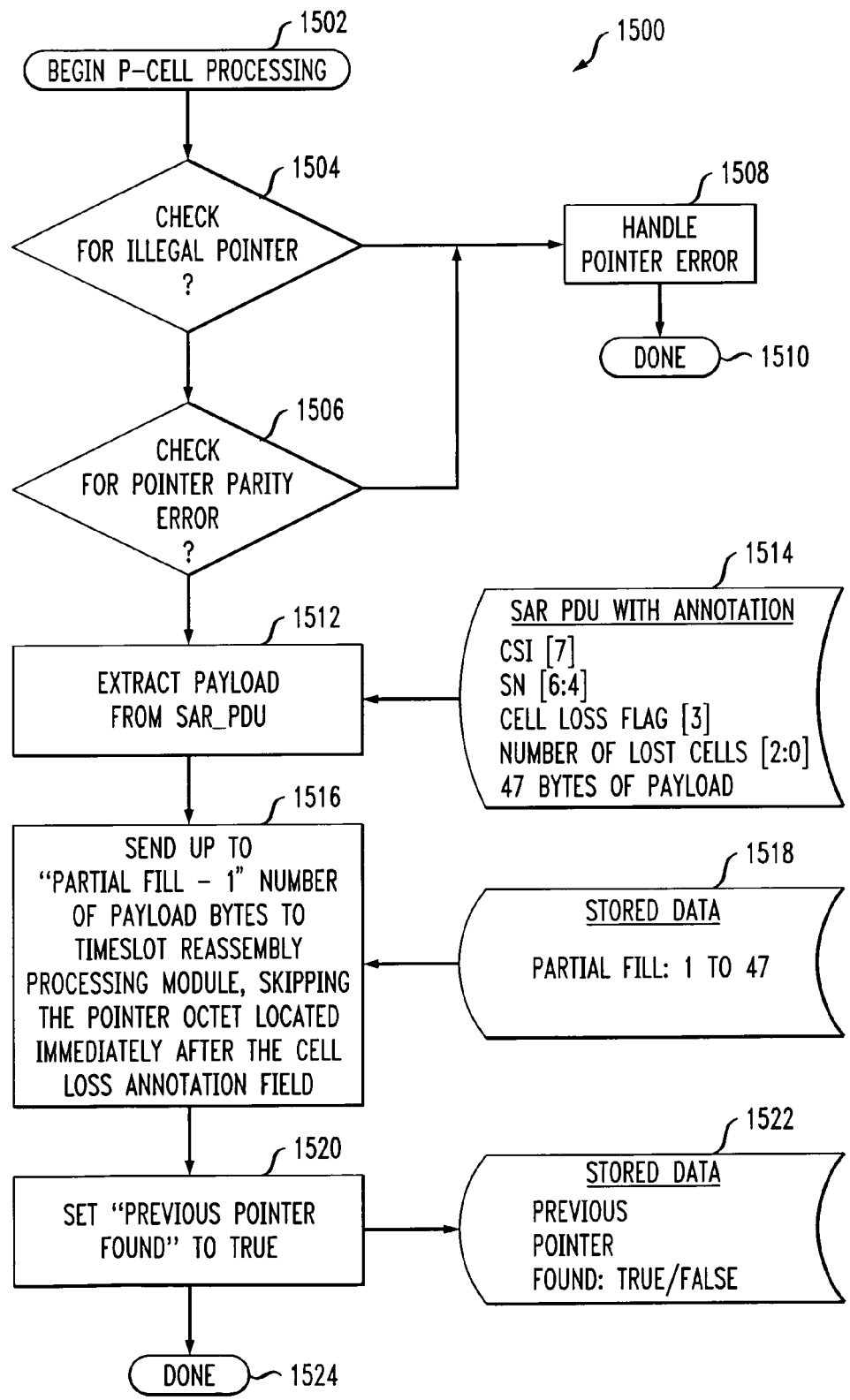
FIG. 15 depicts inventive method steps for handling P-type cells in accordance with the present invention.

It will be appreciated that the following discussion of the handling of P-cells and non-P-cells has particular applicable to the ATM AAL1 SAR-PDU data format; however, it will be appreciated that other appropriate types of handling and reconstruction can be employed for different types of cells. Referring now to FIG. 15, which depicts a flow chart 1500 for handling a P-cell, P-cell processing can begin at block 1502, followed by a decision block 1504 where a check is made for an illegal pointer. If an illegal pointer is found the pointer error can be handled per block 1508 and the process completed per block 1510. If no illegal pointer is found, again a check can be made for a pointer parity error as per block 1506; if such an error is detected it can be handled as per block 1508. The aforementioned pointer-related operations can be conducted in accordance with ITU-T I.363.1. If no error is detected, one can proceed to block 1512 and extract the payload from the SAR-PDU. The appropriate data to be obtained is indicated at block 1514. An appropriate number of payload bytes can then be sent to the time slot re-assembly processing module as indicated at block 1516. One would skip the pointer octet located immediately after the cell loss annotation field, because this would be the pointer octet in the P-cell and not desired payload data. When the entire payload area is not used, rather than sending a number of payload bytes equal to the complete potential payload space to the type slot re-assembly processing module, only "partial fill minus 1" payload bytes may be sent, where "partial fill" is a parameter ranging from 1-47 indicating how many bytes are actually being used for data, as indicated as block 1518. When the entire payload area is used (partial fill=47), only 46 bytes of payload may be transported due to the use of the pointer byte, which reduces the amount of payload by one; if partial fill is less than 47, then a number of bytes of payload equal to partial fill may be carried, where partial fill (PF) is a parameter ranging from 1 to 46. At block 1520, the "previous pointer found" parameter can be set to true and stored as per block 1522, and then the process can be finished as per block 1524.

Figure 16:
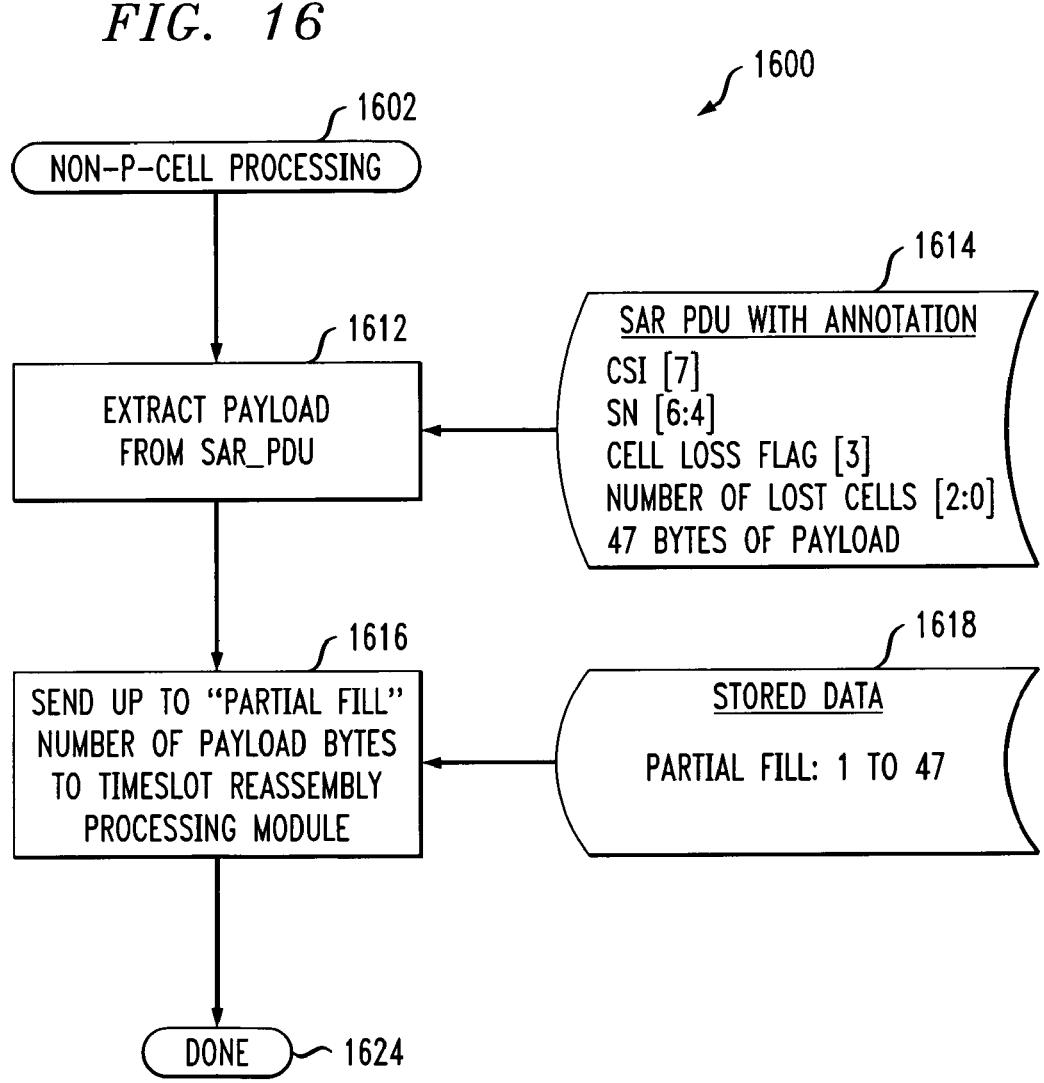
FIG. 16 depicts inventive method steps for handling non-P-cells in accordance with the present invention.

Reference should be had now to FIG. 16 which depicts a flow chart 1600 showing method steps for handling non-P-cells. Blocks analogous to those in FIG. 15 have received the same reference character incremented by 100. Processing begins at block 1602, and the payload is extracted at block 1612 from SAR-PDU 1614. Since there is no need to be concerned with a pointer field, at block 1616 one simply sends "partial fill" number of payload bytes to the timeslot re-assembly processing module. "Partial fill" is a stored data parameter in 1618 indicating how many bytes of the available payload are actually being used. The process ends at block 1624.

Figure 17:
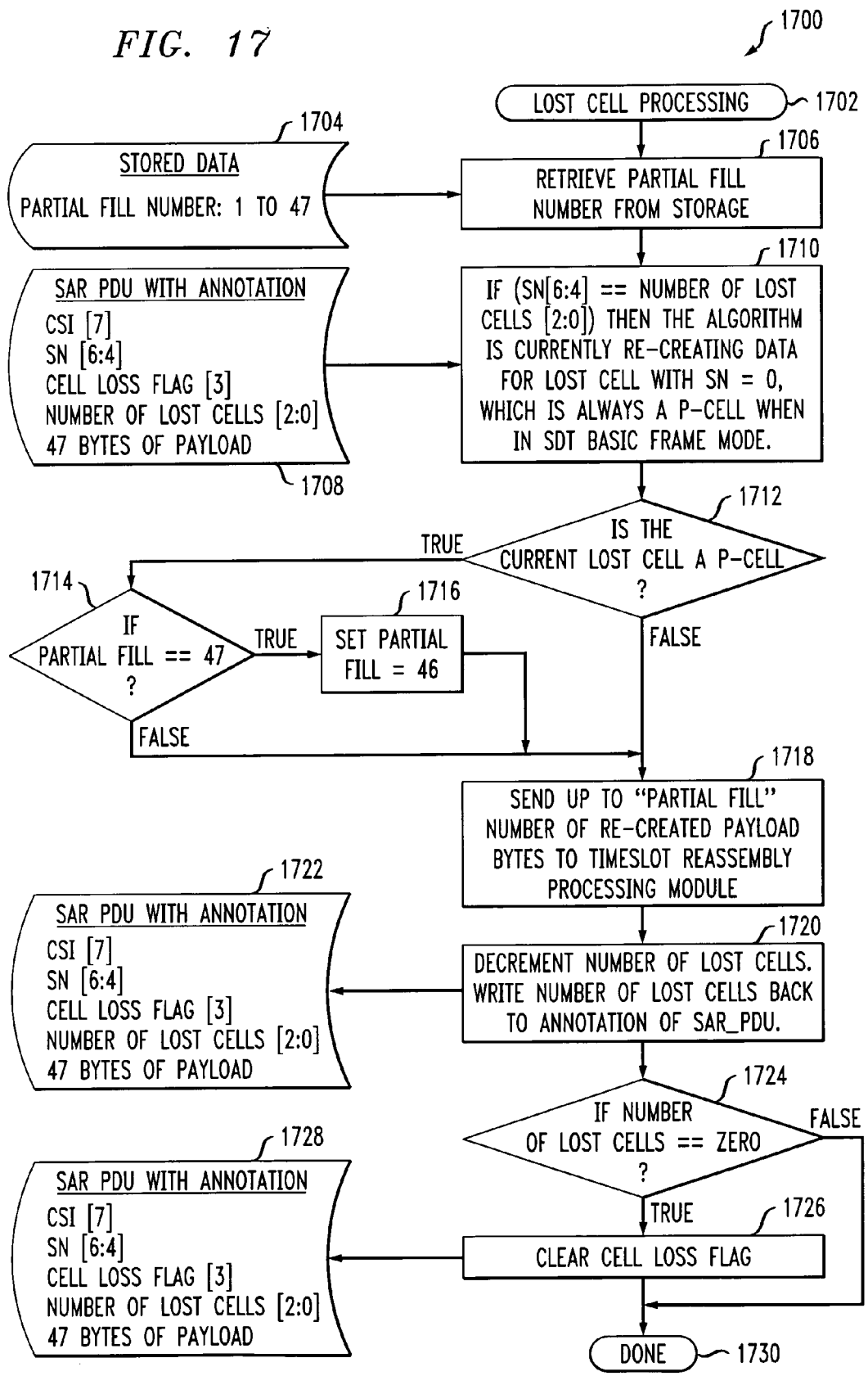
FIG. 17 depicts inventive method steps for lost cell processing in accordance with the present invention.

Attention should now be given to FIG. 17 which depicts a flow chart 1700 showing an example of how lost cell processing may be conducted with the present invention. Processing begins at block 1702, and a "partial fill" number 1704 is retrieved from storage at block 1706. Then, the annotated SAR-PDU 1708 is retrieved at block 1710, and it is determined whether the sequence number occupying bits 4, 5 and 6 of the header is equal to the number of lost cells occupying bits 0, 1 and 2 of the header. If that is the case, one is dealing with a lost cell having a sequence number equal to zero, which is always a P-cell when operating in the structured data transfer (SDT) basic frame mode of AAL1. Thus, a decision can be made at block 1712 whether one is dealing with a P-cell. If such is the case, and the "partial fill" is equal to 47 as per block 1714, the "partial fill" can be reset to 46 as per block 1716 to take account of the pointer field. If the cell is not a P-cell, then one proceeds directly to block 1718, and sends up to "partial fill" number of recreated payload bytes to the timeslot reassembly processing module. It will be appreciated that in the case where a P-cell is being dealt with, one proceeds to block 1718 after resetting the "partial fill," if necessary, as per blocks 1714, 1716.

In block 1720, the number of lost cells is decremented and the annotated SAR-PDU 1722 is updated with the revised number of lost cells. At decision block 1724, if the number of lost cells is 0, then the cell loss flag is cleared at block 1726 in annotated SAR-PDU 1728. This indicates that the next time through the process one would be dealing with a valid payload. Conversely, if the number of lost cells is not equal to 0, then one completes this cycle per block 1730 and on the next time through will detect that lost cells remain and process them appropriately.

Figure 18:
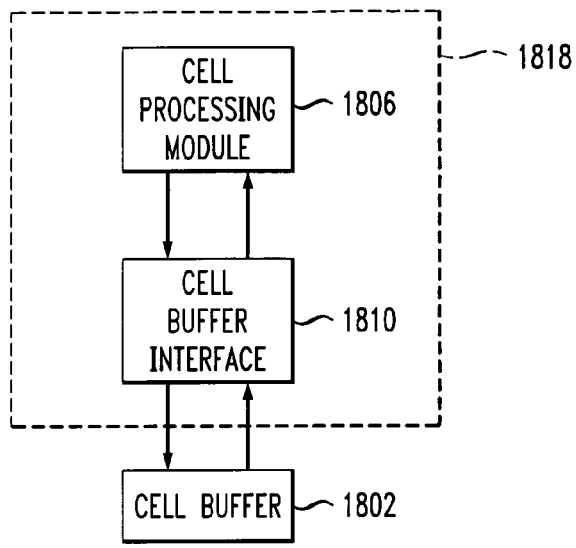
FIG. 18 depicts an apparatus for processing cells in accordance with the present invention.

FIG. 18 depicts an apparatus 1818 for processing cells in a communication system and for interfacing with a cell buffer 1802. The apparatus includes a cell processing module 1806 and a cell buffer interface 1810 that is coupled to the cell processing module 1806 and configured to interface with the cell buffer 1802. Module 1806 can be configured to obtain a cell, cause the cell to be stored through the buffer interface, determine whether the cell is associated with a loss event, and if the cell is associated with a loss event, caused the cell to be tagged with a lost cell indicator of the type described above. Any type of appropriate processing module, buffer interface and buffer can be employed, however, it is preferred to employ the header and sequence number processing module 106, CDV buffer interface 110, and CDV buffer 102 as described above. Accordingly, elements in FIG. 18 that are analogous to elements in FIG. 1 have received the same reference character incremented by 1700. Processing module 1806 can be configured to perform the various method steps discussed above. It will be appreciated that the preferred approach of employing the CDV buffer interface 110, the CDV buffer 102, and the header and sequence number processing module 106 has particular applicability to ATM AAL1 cells.

Figure 19:
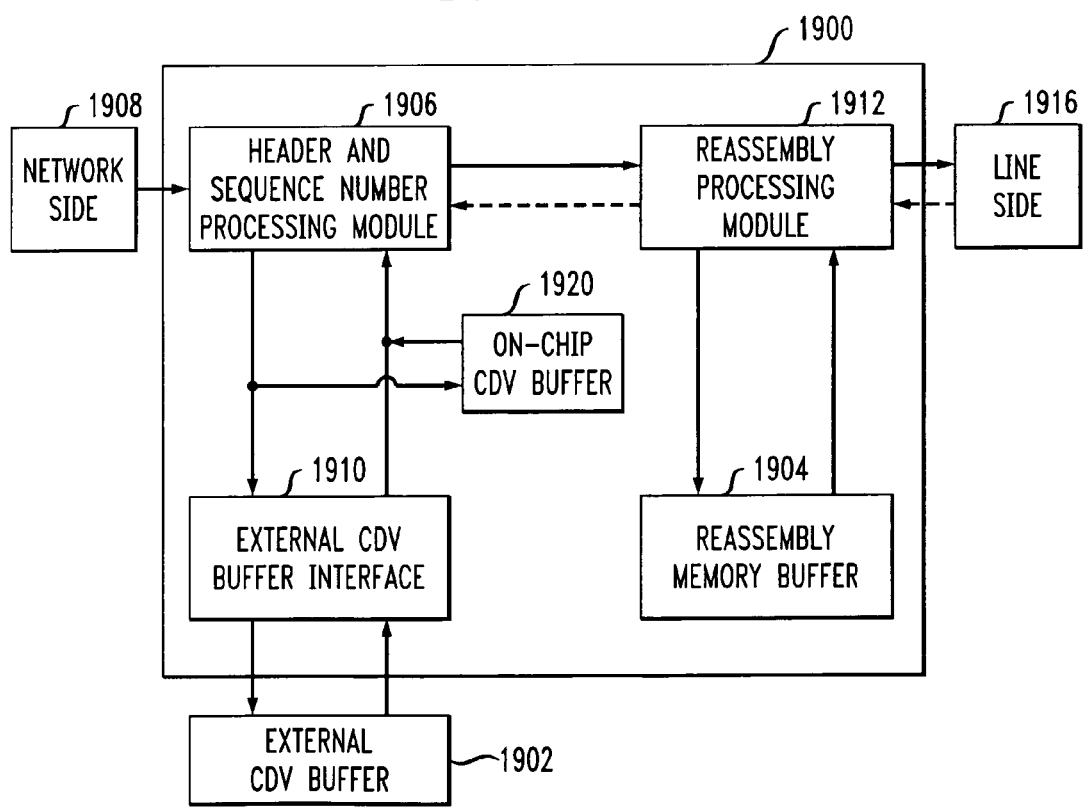
FIG. 19 depicts a preferred manner of implementing the present invention using an Application Specific Integrated Circuit (ASIC)

FIG. 19 shows an exemplary preferred embodiment of the present invention implemented as an application specific integrated circuit (ASIC) 1900. Elements in FIG. 19 that are analogous to those in FIG. 1 have received the same reference character incremented by 1800. In the embodiment shown in FIG. 19, the header and sequence number processing module 1906, re-assembly processing module 1912, CDV buffer interface 1910, and re-assembly memory buffer 1904 are all implemented as part of ASIC 1900. CDV buffer interface 1910 is configured to interface with an external CDV buffer 1902, which can advantageously be implemented in relatively inexpensive commodity memory. In this case, the re-assembly memory buffer 1904 is located on ASIC 1900 and a separate re-assembly memory buffer interface is not depicted. It will be appreciated that a buffer interface for either buffer can include appropriate interconnections for the case when the buffer is external to the ASIC 1900; when the buffer is located on ASIC 1900, the interface can simply include appropriate interconnections directly on the ASIC 1900 (suggested by the bidirectional arrows). The embodiment depicted in FIG. 19 includes an on-chip CDV buffer 1920 which performs the same function as the external CDV buffer 1902 and is located directly on the ASIC chip 1900. Header and sequence number processing module can employ external CDV buffer 1902, on-chip CDV buffer 1920, or both. An advantage of the on-chip CDV buffer 1920 and the interface 1910 for the external CDV buffer 1902 is greater flexibility in the applications that the ASIC 1900 can be employed in. For example, some applications, such as those supporting cell phone equipment, require very little memory. These may be best served by not using the external CDV buffer 1902 at all, in order to reduce cost. A single chip solution employing a small amount of on-board memory for buffer 1920 may be the most cost-effective solution in such a case.

Figure 20:
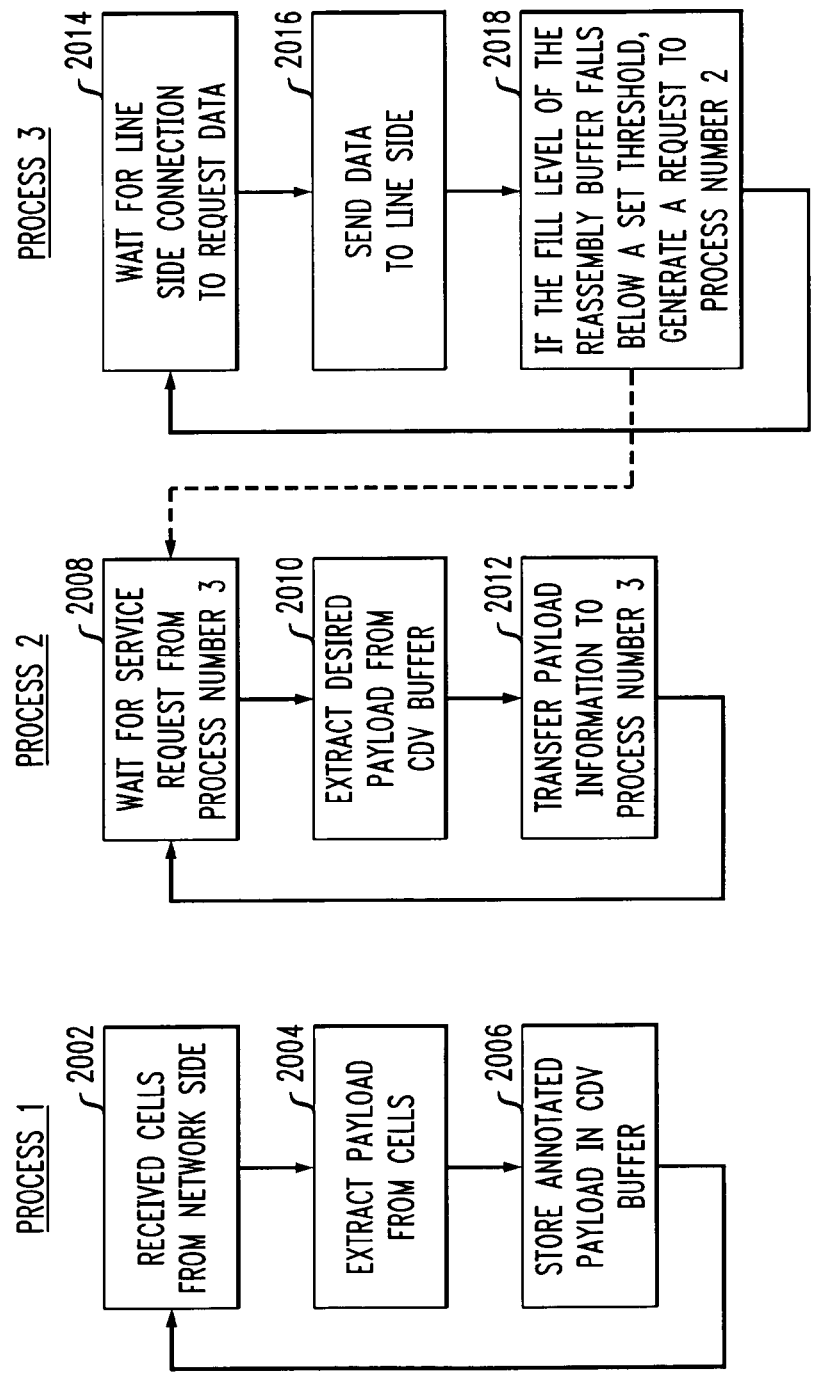
FIG. 20 is a flow chart showing a preferred implementation of the method of FIG. 4.

Attention should now be given to FIG. 20, which shows a flow diagram 2000 of a preferred technique for implementing the method of FIG. 4, employing three separate but interrelated processes. In the first process, cells are received from the network side at block 2002, payloads are extracted at block 2004, and the annotated payload is stored in a CDV buffer at 2006. In the second process, at block 2008, a service request from process 3 is awaited. At block 2010, responsive to receipt of such a request, indicated by the dotted arrow, a desired payload is extracted from the CDV buffer. At block 2012, payload information is transferred to process 3. In process 3, block 2014 indicates that a request for data from the line side is awaited. When such is received, data is sent to the line side per block 2016. Then, per block 2018, if the fill level of the reassembly buffer falls below a set threshold (or other suitable criteria), a request is generated to process 2.

At least a portion of the techniques of the present invention described herein may be implemented in an integrated circuit. In forming integrated circuits, a plurality of identical die are typically fabricated in a repeated pattern on a surface of a semi-conductor wafer. Each die may include circuit elements implementing one or more of the elements described herein, and may include other structures or circuits. The individual die are cut or diced from the wafer, and then packaged as an integrated circuit. One skilled in the art will know how to dice wafers and package die to produce integrated circuits. Integrated circuits so manufactured are considered part of this invention. Such integrated circuits can include circuits that implement a single processor, multiple processors, memory, interfaces, and the like, and include ASICs such as that discussed above.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

What is claimed is:

1. A method of processing cells in a communications system, said method comprising the steps of:
   obtaining a cell from a cell sequence, wherein said cell sequence is assigned a unique channel identifier and wherein said cell sequence contains only cells of a single type that are assigned said unique channel identifier for cell routing;
causing said cell to be stored;
determining whether said cell is associated with a loss event, wherein said loss event is a loss of one or more cells in said cell sequence; and
if said cell is associated with a loss event:
compressing information pertaining to a lost cell lost in said loss event to form a compressed lost cell indicator; and
causing said cell obtained from said cell sequence to be tagged with said compressed lost cell indicator.

2. The method of claim 1, further comprising the additional step of repeating said obtaining step, said step of causing storage, said determining step; and said step of causing said cell to be tagged if said cell is associated with a loss event, for a desired cell sequence.

3. The method of claim 2, wherein said cell is determined to be associated with a loss event if it immediately follows said loss event.

4. The method of claim 2, wherein said cell is an asynchronous transfer mode adaptation layer 1 cell.

5. The method of claim 2, further comprising the additional step of determining a number of lost cells lost in said loss event.

6. The method of claim 5, wherein said compressed indicator comprises:
a cell loss indication field; and
a number of lost cells field indicative of said number of lost cells lost in said loss event.

7. The method of claim 5 wherein said cell is an asynchronous transfer mode adaptation layer 1 cell and said compressed indicator is formed as a header portion of said cell, said header portion comprising:
a convergence sublayer indication bit;
three bits indicative of a sequence number;
a one bit cell loss indication field; and
a three bit number of lost cells field indicative of said number of lost cells lost in said loss event.

8. The method of claim 5, wherein said step of determining said number of lost cells comprises the sub-steps of:
determining whether a sequence number, SN1, of said cell is at least equal to a sequence number, SN2, of a cell obtained just prior to said cell; and
calculating said number of lost cells, $N_{lost}$ as $N_{lost}$=SN1−SN2−1, if SN1≧SN2.

9. The method of claim 5, wherein said step of determining said number of lost cells comprises the sub-steps of:
determining whether a sequence number, SN1, of said cell is less than a sequence number, SN2, of a cell obtained just prior to said cell; and
calculating said number of lost cells, $N_{lost}$, as $N_{lost}$=7−SN2+SN1, if SN1<SN2.

10. The method of claim 5, further comprising the additional steps of:
extracting a given stored cell of said desired cell sequence from storage;
determining whether said given stored cell is tagged with said lost cell indicator; and
if said given stored cell is tagged with said lost cell indicator, recreating payload data for said number of lost cells lost in said loss event.

11. The method of claim 5, further comprising the additional steps of:
extracting a given stored cell of said desired cell sequence from storage;
determining whether said given stored cell is tagged with said lost cell indicator; and
if said given stored cell is not tagged with said lost cell indicator, extracting payload data from said given stored cell.

12. The method of claim 2, wherein said storing step comprises storing said cell in a cell delay variation buffer.

13. An apparatus for processing cells in a communications system and for interfacing with a cell buffer, said apparatus comprising:
a cell processing module; and
a cell buffer interface coupled to said processing module and configured to interface with the cell buffer;
wherein said processing module is configured to:
obtain a cell from a cell sequence, wherein said cell sequence is assigned a unique channel identifier and wherein said cell sequence contains only cells of a single type that are assigned said unique channel identifier for cell routing;
cause the cell to be stored through said buffer interface;
determine whether the cell is associated with a loss event, wherein said loss event is a loss of one or more cells in said cell sequence; and
if the cell is associated with a loss event:
compress information pertaining to a lost cell lost in the loss event to form a compressed lost cell indicator; and
cause the cell obtained from said cell sequence to be tagged with said compressed lost cell indicator.

14. The apparatus of claim 13, wherein:
said cell processing module comprises a header and sequence number processing module;
said cell buffer comprises a cell delay variation buffer; and
said processing module is further configured to repeat said obtaining, said causing of storage through said buffer interface, said determining; and said causing the cell to be tagged if the cell is associated with a loss event, for a desired cell sequence.

15. The apparatus of claim 14, wherein the cell is determined to be associated with a loss event if it immediately follows the loss event.

16. The apparatus of claim 14, wherein the cell is an asynchronous transfer mode adaptation layer 1 cell.

17. The apparatus of claim 14, wherein said processing module is further configured to determine a number of lost cells lost in the loss event.

18. The apparatus of claim 17, wherein the compressed indicator comprises:
a cell loss indication field; and
a number of lost cells field indicative of the number of lost cells lost in the loss event.

19. The apparatus of claim 17, wherein the cell is an asynchronous transfer mode adaptation layer 1 cell and the compressed indicator is formed as a header portion of the cell, the header portion comprising:
a convergence sublayer indication bit;
three bits indicative of a sequence number;
a one bit cell loss indication field; and
a three bit number of lost cells field indicative of the number of lost cells lost in the loss event.

20. The apparatus of claim 17, wherein said processing module determines the number of lost cells by determining whether a sequence number, SN1, of the cell is at least equal to a sequence number, SN2, of a cell obtained just prior to the cell; and calculates the number of lost cells, $N_{lost}$, as $N_{lost}$=SN1−SN2−1, if SN1≧SN2.

21. The apparatus of claim 17, wherein said processing module determines the number of lost cells by determining whether a sequence number, SN1, of the cell is less than a sequence number, SN2, of a cell obtained just prior to the cell; and calculates the number of lost cells, $N_{lost}$, as $N_{lost}=7-SN2+SN1$, if $SN1<SN2$.

22. The apparatus of claim 17, wherein said processing module is further configured to:
   extract a given stored cell of the desired cell sequence from storage;
   determine whether the given stored cell is tagged with the lost cell indicator; and
   if the given stored cell is tagged with the lost cell indicator, recreate payload data for the number of lost cells lost in the loss event.

23. The apparatus of claim 17, wherein said processing module is further configured to:
   extract a given stored cell of the desired cell sequence from storage;
   determine whether the given stored cell is tagged with the lost cell indicator; and
   if the given stored cell is not tagged with the lost cell indicator, extract payload data from the given stored cell.

24. An integrated circuit for processing cells in a communications system and for interfacing with a cell buffer, said integrated circuit comprising:
   a cell processing module; and
   a cell buffer interface coupled to said processing module and configured to interface with the cell buffer;
   wherein said processing module is configured to:
      obtain a cell from a cell sequence, wherein said cell sequence is assigned a unique channel identifier and wherein said cell sequence contains only cells of a single type that are assigned said unique channel identifier for cell routing;
      cause the cell to be stored through said buffer interface;
      determine whether the cell is associated with a loss event, wherein said loss event is a loss of one or more cells in said cell sequence; and
      if the cell is associated with a loss event:
         compress information pertaining to a lost cell lost in the loss event to form a compressed lost cell indicator; and
         cause the cell obtained from said cell sequence to be tagged with said compressed lost cell indicator.

25. The integrated circuit of claim 24, wherein:
   said integrated circuit comprises an application specific integrated circuit; and
   the cell buffer is external to said integrated circuit.

26. The integrated circuit of claim 25, further comprising an on-chip cell buffer formed on said application specific integrated circuit, wherein said cell processing module is configurable to selectively communicate with the external cell buffer and said on-chip cell buffer.

* * * * *

UNITED STATES PATENT AND TRADEMARK OFFICE
CERTIFICATE OF CORRECTION

| | | |
|---|---|---|
| PATENT NO. | : 8,169,891 B2 | Page 1 of 1 |
| APPLICATION NO. | : 11/095774 | |
| DATED | : May 1, 2012 | |
| INVENTOR(S) | : Kenneth Isley | |

It is certified that error appears in the above-identified patent and that said Letters Patent is hereby corrected as shown below:

On the Title Page

Item (57), abstract section, the portion reading "to be stored, determined if it is associated with a loss event, and" should read --to be stored, determining if it is associated with a loss event, and--.

Signed and Sealed this
Fifteenth Day of October, 2013

Teresa Stanek Rea
*Deputy Director of the United States Patent and Trademark Office*